United States Patent
Teuwen

(10) Patent No.: US 9,501,301 B2
(45) Date of Patent: Nov. 22, 2016

(54) FLEXIBLE INSTRUCTION SETS FOR OBFUSCATED VIRTUAL MACHINES

(71) Applicant: NXP B.V., Eindhoven (NL)

(72) Inventor: Philippe Teuwen, Etterbeek (BE)

(73) Assignee: NXP B.V., Eindhoven (NL)

( * ) Notice: Subject to any disclaimer, the term of this patent is extended or adjusted under 35 U.S.C. 154(b) by 44 days.

(21) Appl. No.: 14/632,879

(22) Filed: Feb. 26, 2015

(65) Prior Publication Data
US 2016/0253189 A1 Sep. 1, 2016

(51) Int. Cl.
G06F 21/00 (2013.01)
G06F 9/455 (2006.01)
G06F 21/14 (2013.01)
G06F 9/44 (2006.01)
G06F 21/56 (2013.01)

(52) U.S. Cl.
CPC .............. G06F 9/455 (2013.01); G06F 8/74 (2013.01); G06F 21/14 (2013.01); G06F 21/563 (2013.01)

(58) Field of Classification Search
CPC ........ G06F 9/455; G06F 8/74; G06F 21/563; G06F 21/14
USPC ...................................................... 726/22, 26
See application file for complete search history.

(56) References Cited

U.S. PATENT DOCUMENTS

| | | | | |
|---|---|---|---|---|
| 5,596,755 A * | 1/1997 | Pletcher | ................ | G06F 9/4812 710/261 |
| 6,272,636 B1 * | 8/2001 | Neville | ................... | G06F 21/10 705/57 |
| 6,848,111 B1 * | 1/2005 | Schwabe | ............... | G06F 9/4426 712/E9.083 |
| 9,251,090 B1 * | 2/2016 | Borthakur | ........... | G06F 12/1009 |
| 2003/0093685 A1 * | 5/2003 | Tobin | .................... | G06F 21/126 713/190 |
| 2006/0036426 A1 * | 2/2006 | Barr | ..................... | G06F 17/5009 703/22 |
| 2010/0153776 A1 * | 6/2010 | Vick | ................... | G06F 9/30123 714/15 |
| 2010/0180346 A1 | 7/2010 | Nicolson et al. | | |
| 2013/0080773 A1 * | 3/2013 | Lu | ...................... | G06F 21/6209 713/165 |

FOREIGN PATENT DOCUMENTS

EP 2482184 A1 8/2012
EP 2942727 A1 11/2015

OTHER PUBLICATIONS

Scherzo; "Inside Code Virtualizer"; Code Virtualizer; Total Obfuscation against Reverse Engineering, x32/x64 Edition; pp. 1-28; Feb. 16, 2007.
OpenRCE.org; "Compiler 1, X86 Virtualizer 0"; http://www.openrce.org/blog/view/1110/; pp. 1-6; Apr. 4, 2008.

(Continued)

*Primary Examiner* — Sarah Su

(57) ABSTRACT

A method for protecting computer software code is disclosed. In the embodiment, the method involves receiving instructions corresponding to computer software code for an application, the instructions including a first section of instructions to protect that is indicated by a first indicator and a second section of the instructions to protect that is indicated by a second indicator, rewriting the first section of instructions into a first section of virtual instructions, and rewriting the second section of instructions into a second section of virtual instructions, wherein the first section of instructions includes a first virtual instruction that corresponds to a first handler and the second section of virtual instructions includes a second virtual instruction that corresponds to a second handler, the first handler having different properties than the second handler.

20 Claims, 11 Drawing Sheets

(56) References Cited

OTHER PUBLICATIONS

Lau, Boris; "Dealing with Virtualization packer"; CARO 2008, Amsterdam; 67 pgs.; May 2008.
Rolles, Rolf; "Unpacking VMProtect"; OpenRCE.org; http://www.openrce.org/blog/view/1238/; pp. 1-3; Aug. 2008.
"Fighting Oreans' VM"; http://www.woodmann.com/forum/showthread.php?12015-Fighting-OreansVM: pp. 1-7; Aug. 2008.
Sharif, M. et al.; "Automatic Reverse Engineering of Malware Emulators"; 16 pgs.; 2009.
Rolles, R.; "Unpacking Virtualization Obfuscators"; http://static.usenix.org/event/woot09/tech/full_papers/rolles.pdf; 7 pgs.; 2009.
Sharif, M. et al.; "Rotalume: A Tool for Automatic Reverse Engineering of Malware Emulators"; http://www.iseclab.org/people/andrew/download/GT-CS-09-05.pdf; 21 pgs.; May 2009.
Wang, Zhenxiang Jim; "How to recover virtualized x86 instructions by Themida"; http://www.virusbtn.com/conference/vb2009/abstracts/Wang.xml; pp. 1-2; 2009.
Falliere, Nicolas et al.; "Inside the Jaws of Trojan.Clampi"; http://www.symantec.com/content/en/us/enterprise/media/security_response/whitepapers/inside_trojan_clampi.pdf; pp. 1-24; Sep. 2009.
Coogan, Kevin Patrick; "Deobfuscation of Packed and Virtualization Obfuscation Protected Binaries"; http://arizona.openrepository.com/arizona/bitstream/10150/202716/1/azu_etd_11707_sip1_m.pdf; pp. 1-117; 2011.
Coogan, Kevin Patrick; "Deobfuscating of of Virtualization-Obfuscated Software"; hhttp://www.cs.arizona.edu/~debray/Publications/ccs-unvirtualize.pdf; 10 pgs.; Oct. 2011.
Ghosh, Sudeep et al.; "Replacement Attacks Against VM-protected Applications"; http://www.cl.cam.ac.uk/research/srg/netos/vee_2012/papers/p203.pdf; pp. 203-214; 2012.
Kinder, Johannes; "Towards Static Analysis of Virtualization Obfuscated Binaries"; http://infoscience.epfl.ch/record/181023/files/wcre12.pdf; pp. 1-10; Oct. 2012.
Kot, Paul; "Decompiler for Code Virtualizer (Oreans)"; http://gdtr.wordpress.com/2012/10/03/decv-a-decompiler-for-code-virtualizer-by-oreans/; 10 pgs.; Oct. 2012.
Kholia, Dhiru et al.; "Looking inside the (Drop) box"; http://www.openwall.com/presentations/WOOT13-Security-Analysis-of-Dropbox/woot13-kholia.pdf; 7 pgs.; Aug. 2013.
Yadegari, Babak et al.; "Automatic Deobfuscation of Emulation-Obfuscated Software"; 11 pgs.; Nov. 2013.
Deathway; "Oreans UnVirtualizer ODBG Plugin"; http://forum.exetools.com/showthread.php?t=13391; 6 pgs.; Jan. 2014.
Souchet, Axel; "Breaking Kryptonite's Obfuscation: A Static Analysis Approach Relying on Symbolic Execution"; http://doar-e.github.io/blog/2013/09/16/breaking-kyptonites-obfuscation-with-symbolic-execution/; 14 pgs.; Sep. 2013.
Wikipedia; "Concolic Testing"; https://en.wikipedia.org/wiki/Concolic_testing; 8 pgs.; Dec. 9, 2014.
Anonymous:, "Enterprise Obfuscation Technology Process and Control", Dec. 31, 2013 (Dec. 31, 2013), XP055281576, Retrieved from the Internet: URL: https://www.preemptive.com/images/white_papers/Enterprise-Obfuscation-Technology-Process-and-Control.pdf.

* cited by examiner

```
a=3;
b=9;
c=a+b;
```
102

COMPILER
110

```
Mov DWORD PTR [rbp-0x4],0x3
Mov DWORD PTR [rbp-0x8],0x9
Mov edx, DWORD PTR [rbp-0x4]
Mov eax, DWORD PTR [rbp-0x8]
Add eax,edx
Mov DWORD PTR [rbp-0xc],eax
```
104

FIG. 1

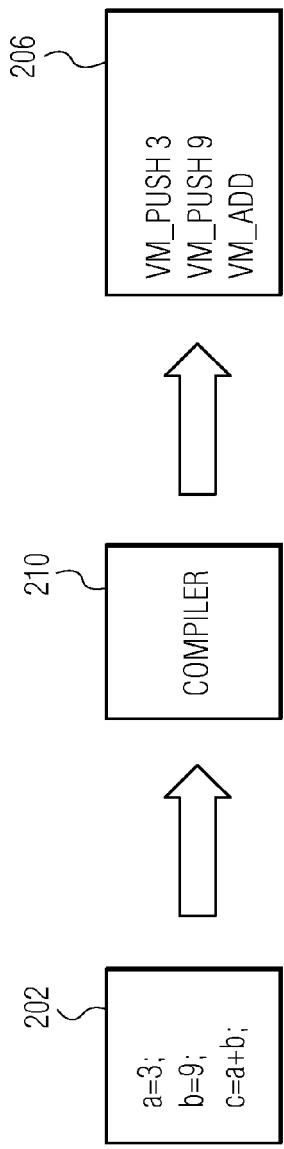
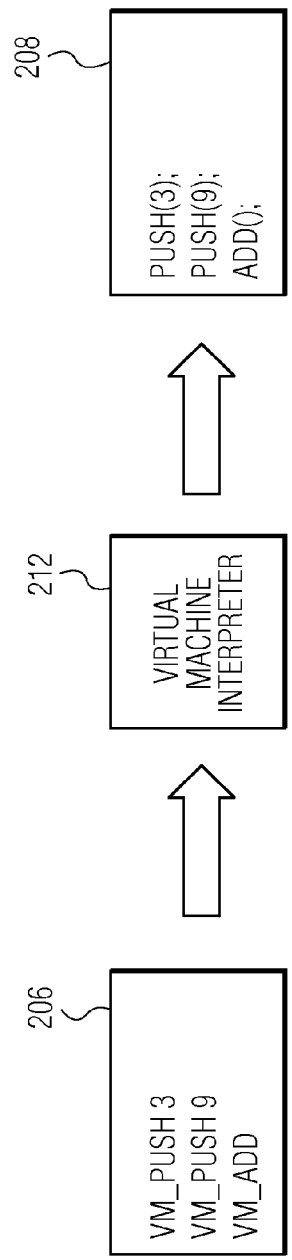

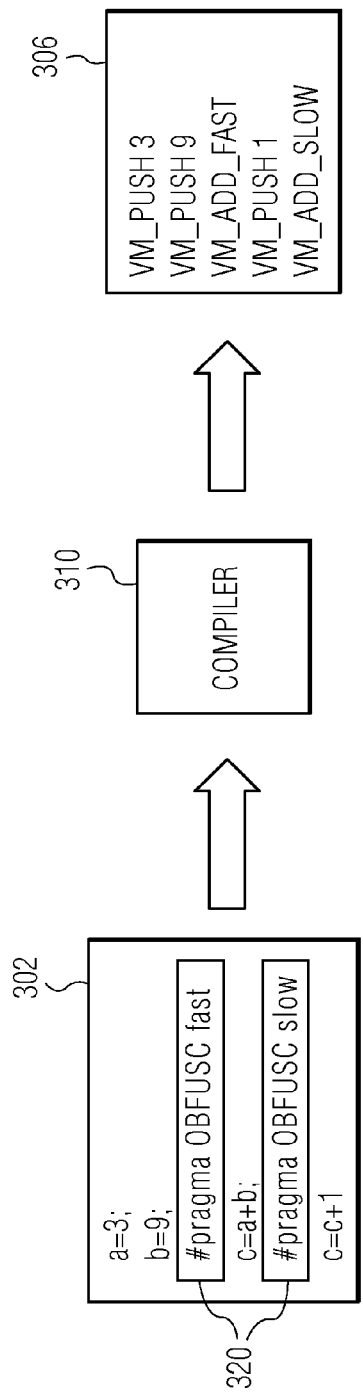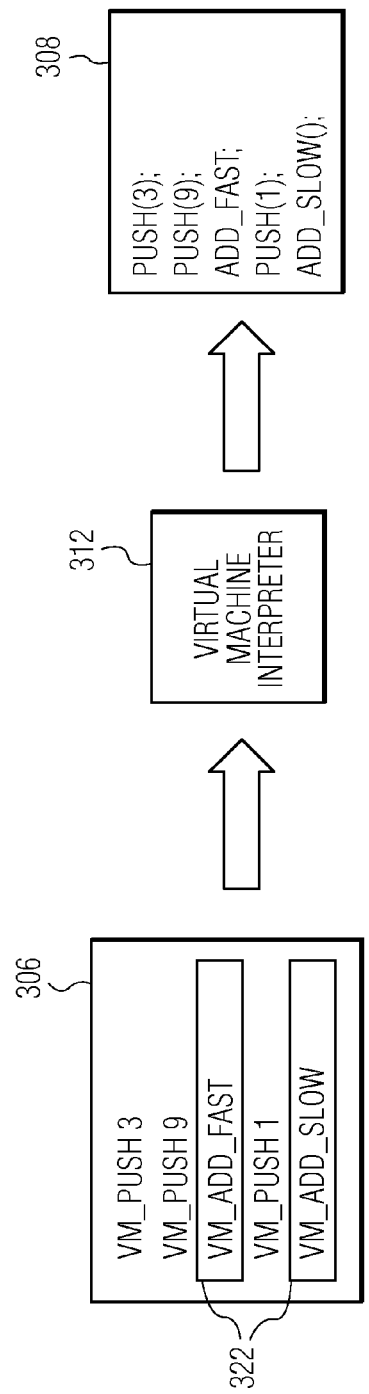
FIG. 3A
FIG. 3B

| BYTECODE | VMX_MODE1 INSTRUCTION | VMX_MODE2 INSTRUCTION | SPECIAL INSTRUCTION |
|---|---|---|---|
| 12 03 | VM1_PUSH 3 | VM2_SHR 3 | N/A |
| 12 09 | VM1_PUSH 9 | VM2_SHR 9 | N/A |
| 23 | VM1_ADD | VM2_SUB | N/A |
| ff 02 | RESERVED | RESERVED | VMX_MODE 2 |
| 45 fe | VM1_pop 254 | VM1_PUSH 1 | N/A |
| 23 | VM1_ADD | VM2_SUB | N/A |

FIG. 8A

FLEXIBLE INSTRUCTION SETS FOR OBFUSCATED VIRTUAL MACHINES

BACKGROUND

Computer software is often subjected to reverse-engineering attempts or other attempts to tamper with the computer software. A successful attempt to reverse-engineer or tamper with the computer software can result in, for example, unauthorized use of the computer software or impermissible access to user information (e.g., user identities, passwords, financial information, etc.). To counter reverse-engineering or other tampering attempts, code protection techniques are often implemented with the intent to increase the complexity of reverse-engineering or other tampering attempts to levels that are impractical to solve.

One code protection technique is obfuscation. Obfuscation is a deliberate attempt to make computer code (source or machine) more difficult to read and, thus, more difficult to reverse-engineer or tamper with. Computer code can be obfuscated in many ways. In particular, virtual machines can be used to implement crafted instruction sets on imaginary processors in order to obfuscate the computer code. Because the instruction sets are crafted for imaginary processors, the function of the instructions in the instruction sets are typically unknown and, thus, unintelligible to parties attempting to reverse-engineer or otherwise tamper with computer software. While obfuscated virtual machines using crafted instruction sets have been effective at increasing the complexity of reverse-engineering or other tampering attempts, the technique can have a negative impact on the execution speed of computer software.

SUMMARY

In an embodiment, a method for protecting computer software code is disclosed. In the embodiment, the method involves receiving instructions corresponding to computer software code for an application, the instructions including a first section of instructions to protect that is indicated by a first indicator and a second section of the instructions to protect that is indicated by a second indicator, rewriting the first section of instructions into a first section of virtual instructions, and rewriting the second section of instructions into a second section of virtual instructions, wherein the first section of instructions includes a first virtual instruction that corresponds to a first handler and the second section of virtual instructions includes a second virtual instruction that corresponds to a second handler, the first handler having different properties than the second handler.

In a second embodiment, a non-transitory computer-readable storage medium is disclosed. In the embodiment, the non-transitory computer-readable storage medium stores instructions that, when executed by a computer, perform steps for protecting computer software code, the steps involving receiving instructions corresponding to computer software code for an application, the instructions including a first section of instructions to protect that is indicated by a first indicator and a second section of instructions to protect that is indicated by a second indicator, rewriting the first section of instructions into a first section of virtual instructions, and rewriting the second section of instructions into a second section of virtual instructions, wherein the first section of instructions includes a first virtual instruction that corresponds to a first handler and the second set of virtual instructions includes a second virtual instructions that corresponds to a second handler, the first handler having different properties than the second handler.

In a third embodiment, a computer-implemented system for protecting computer software code is disclosed. In the embodiment, the computer-implemented system includes one or more processors and memory storing instructions that, when executed by the one or more processors, perform steps involving receiving instructions corresponding to computer software code for an application, the instructions including a first section of instructions to protect that is indicated by a first indicator and a second section of instructions to protect that is indicated by a second indicator, rewriting the first section of instructions into a first section of virtual instructions, and rewriting the second section of instructions into a second section of virtual instructions, wherein the first section of instructions includes a first virtual instruction that corresponds to a first handler and the second set of virtual instructions includes a second virtual instructions that corresponds to a second handler, the first handler having different properties than the second handler.

Other aspects and advantages of embodiments of the present invention will become apparent from the following detailed description taken in conjunction with the accompanying drawings.

BRIEF DESCRIPTION OF THE DRAWINGS

FIG. 1 illustrates the compilation of a section of source code into assembly code.

FIG. 2A illustrates the compilation of a section of source code into bytecode.

FIG. 2B illustrates the interpretation of bytecode to execute a program.

FIG. 3A illustrates the compilation of sections of source code into obfuscated bytecode using indicators.

FIG. 3B illustrates the interpretation of sections of obfuscated bytecode, as indicated by indicators, to execute a program.

FIG. 8A is a table that indicates a mapping of bytecodes to virtual machine instructions depending on the mode of the virtual machine.

Throughout the description, similar reference numbers may be used to identify similar elements.

DETAILED DESCRIPTION

Figure 4:
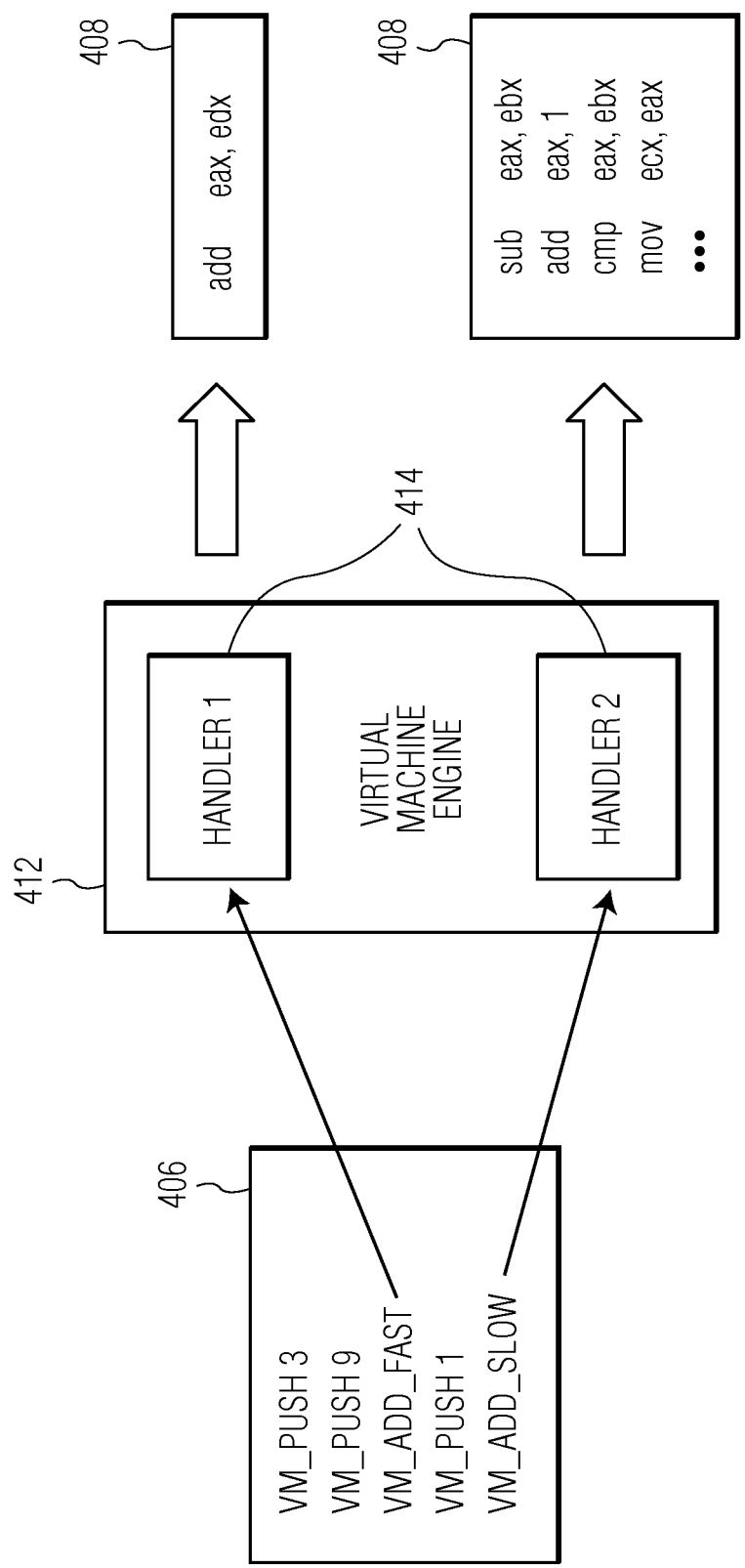
FIG. 4 illustrates a virtual machine engine receiving obfuscated bytecode and executing functions called by two different handlers.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

FIG. 1 illustrates the compilation of a section of source code 102 into assembly code 104. In the illustration, the section of source code is passed to a compiler 110 and the compiler generates assembly code for execution by a computer processing unit (CPU).

Compilation of code using a virtual machine includes an additional step that allows the compiled source code to be executed on any architecture (e.g., x86 or 8086) by first compiling source code into bytecode and then interpreting the bytecode to execute corresponding handlers. For example, FIG. 2A illustrates the compilation of a section of source code 202 into bytecode 206. In the illustration, the section of source code is passed to a compiler 210. However, unlike in FIG. 1, the compiler generates specialized bytecode. Then, when executing the program, the bytecode is passed to a specialized interpreter specific to the architecture of the execution environment and the interpreter executes handlers to perform various functions of a program. FIG. 2B illustrates the interpretation of bytecode 206 to execute a program. In the illustration, the bytecode of FIG. 2A is passed to a virtual machine interpreter 212 and the virtual machine interpreter is configured with handlers to interpret the bytecode and to perform functions 208 as needed to execute the program.

When an attacker attempts to reverse-engineer or tamper with a program, the attacker typically records the functions performed by the computer processor and attempts to correlate the functions performed with various sections of the bytecode. Once the correlation is deduced, the attacker can then modify the bytecode and pass the modified bytecode to the interpreter to execute the program in a potentially malicious or otherwise unintended manner. In order to increase the difficulty of correlating the bytecode to the functions performed, code obfuscation can be used to increase the complexity of reverse-engineering or other tampering attempts by adding complexity, changing code words, or otherwise obfuscating the resulting bytecode such that a specialized interpreter is required for execution. Thus, the code is more protected. However, more processing is required to understand the obfuscated bytecode and, thus, the execution time of the program will likely increase. While an increase in execution time may be an acceptable cost for greater protection of some code, not all code needs protection and protecting code that does not need protection can cause the execution time of the program to increase unnecessarily.

In accordance with an embodiment of the invention, a method for protecting computer software code is disclosed. In the embodiment, the method involves receiving instructions corresponding to computer software code for an application, the instructions including a first section of instructions to protect that is indicated by a first indicator and a second section of the instructions to protect that is indicated by a second indicator, rewriting the first section of instructions into a first section of virtual instructions, and rewriting the second section of instructions into a second section of virtual instructions, wherein the first section of virtual instructions includes a first indicator that corresponds to a first handler and the second section of virtual instructions includes a second indicator that corresponds to a second handler, the first handler having different properties than the second handler. Accordingly, different sections of instructions can be executed at different speeds by rewriting the different sections of instructions into sections of virtual instructions configured to correspond with different handlers. In an embodiment, each handler is defined by one or more properties including, for example, the number of instructions needed to perform a given function, the instruction set architecture (including data types, instructions, registers, addressing modes, etc.), the number of registers used, or the number of fake or dummy instructions in the instruction set. Thus, one level of obfuscation need not be used for all instructions in a computer program, but rather can be selected on a section by section basis. Since some sections of instructions can have low obfuscation with quick execution and some sections can have high obfuscation with slow execution, the execution time can be increased while still maintaining high levels of obfuscation when needed.

FIG. 3A illustrates the compilation of sections of source code 302 into obfuscated bytecode 306 using indicators 320. In an embodiment, obfuscated bytecode is formed from a set of virtual instructions such as portable code (p-code) for use with JAVA, Python, or PHP based virtual machines. As illustrated, the source code includes a first indicator ("#pragma OBFUSC fast") and a second indicator ("#pragma OBFUSC slow"). In the illustration, the indicators are C pragmas, but other operators that can be embedded in the source code could be used as indicators as well. When the source code is passed to a compiler 310, the compiler produces bytecode with different properties for each section of source code. For example, as illustrated, the section of source code that is indicated by the first indicator is compiled to include the instruction "VM_ADD_FAST," while the section of source code that is indicated by the second indicator is compiled to include the instruction "VM_ADD_SLOW." Then, when the program is executed, the two ADD instructions will be interpreted differently.

FIG. 3B illustrates the interpretation of sections of obfuscated bytecode 306, as indicated by indicators 322, to execute a program. As illustrated in FIG. 3B, the bytecode of FIG. 3A is passed to a virtual machine interpreter 312 and handlers (not shown) that correspond to indicators (e.g., the VM_ADD_FAST or VM_ADD_SLOW instruction) perform functions 308 as needed to execute the program. Because different handlers correspond to VM_ADD_FAST than correspond to VM_ADD_SLOW, functions with different degrees of complexity can be called by each handler. Thus, unlike the execution described above with reference to FIG. 2B, the increase in the execution time of the program varies based on the complexity of the functions called by each handler. For example, if ADD_FAST( ) has less complexity that results in a faster execution time than ADD_SLOW( ) then executing ADD_FAST( ) and ADD_SLOW( ) will result in a faster overall execution speed than executing ADD_SLOW( ) twice.

In an embodiment, handlers correspond to instructions in bytecode and each handler can be configured to call a different function when a program is executed. FIG. 4 illustrates a virtual machine engine 412 receiving obfuscated bytecode 406 and executing functions 408 called by two different handlers 414. In an embodiment, the virtual machine engine includes an interpreter (such as the virtual machine interpreter described with reference to FIG. 3B). In the illustration of FIG. 4, the first handler corresponds to bytecode for performing an add function that favors speed of execution over obfuscation. The second handler corresponds to bytecode for performing an add function that favors obfuscation over speed of execution. When the handlers call the corresponding functions, a sequence of assembly code is generated and executed. In an embodiment, the sequence of assembly code generated by the second handler (e.g., the handler that calls a function that favors obfuscation over speed of execution) contains superfluous assembly instructions. Thus, an attacker reading the assembly code generated by the virtual machine engine will receive assembly code with several unnecessary and/or convoluted steps and, therefore, determining which portions of the assembly code are superfluous or what the function of the assembly code is can be difficult and time consuming. This difficulty may discourage an attacker from, for example, reverse-engineering the section of bytecode to which the second handler corresponds and, thus, protect the section of bytecode from attack. Accordingly, when increased protection is needed, bytecode that corresponds to the second handler can be used, while bytecode that corresponds to the first handler can be used when increased protection is not needed, thus, allowing a developer to limit the impact of obfuscation on the speed of performance.

Figure 5:
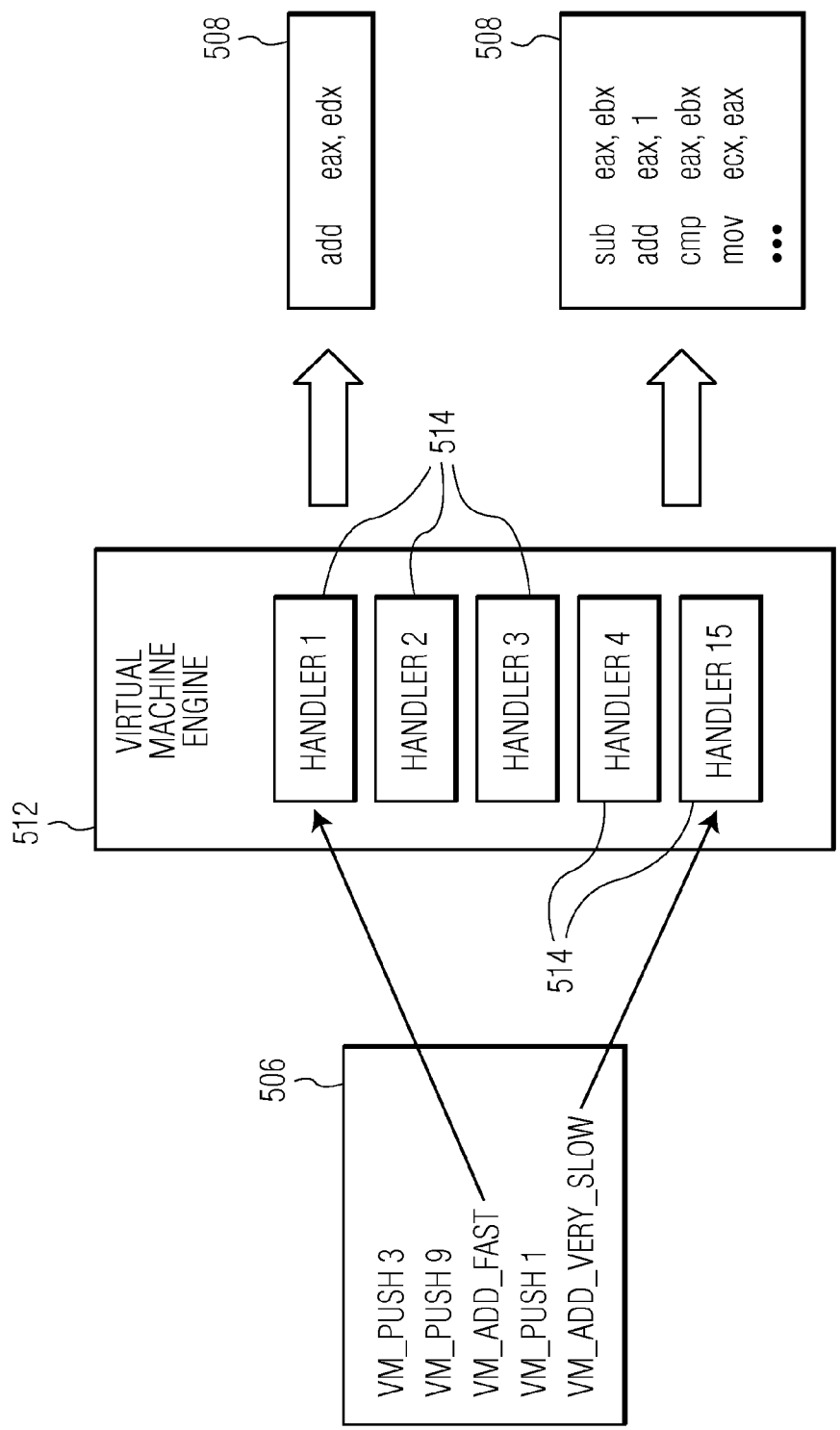
FIG. 5 illustrates a virtual machine engine receiving obfuscated bytecode and executing functions called by two handlers selected from a set of handlers that correspond to degrees of obfuscation and execution speeds.

In an embodiment, several handlers can be used and each handler can correspond to degrees of obfuscation or execution speeds. For example, handlers that correspond to very slow execution, slow execution, normal execution, fast execution, and very fast execution can be used. In an embodiment, the execution speeds are determined relative to each other, but could be determined based on fixed criteria such as the number of functions executed by a handler or the average number of clock cycles required to execute the functions called by a handler. FIG. 5 illustrates a virtual machine engine 512 receiving obfuscated bytecode 506 and executing functions 508 called by two handlers 514 selected from handlers corresponding to degrees of obfuscation and execution speeds. The handler 1 generates "fast" assembly code. In an embodiment, fast assembly code is assembly code that includes a single opcode. Accordingly, a CPU processing the assembly code can process the code very quickly, but the function of the code is barely, if at all, obfuscated. The handler 2 generates "very slow" assembly code. In an embodiment, very slow assembly code is assembly code that includes several opcodes and utilizes several registers to achieve a result that could be achieved with fewer opcodes and/or registers. Accordingly, a CPU processing the assembly code would require a greater amount of time to process the very slow assembly code than to process the fast assembly code, but the very slow assembly code is more obfuscated by comparison.

Figure 6:
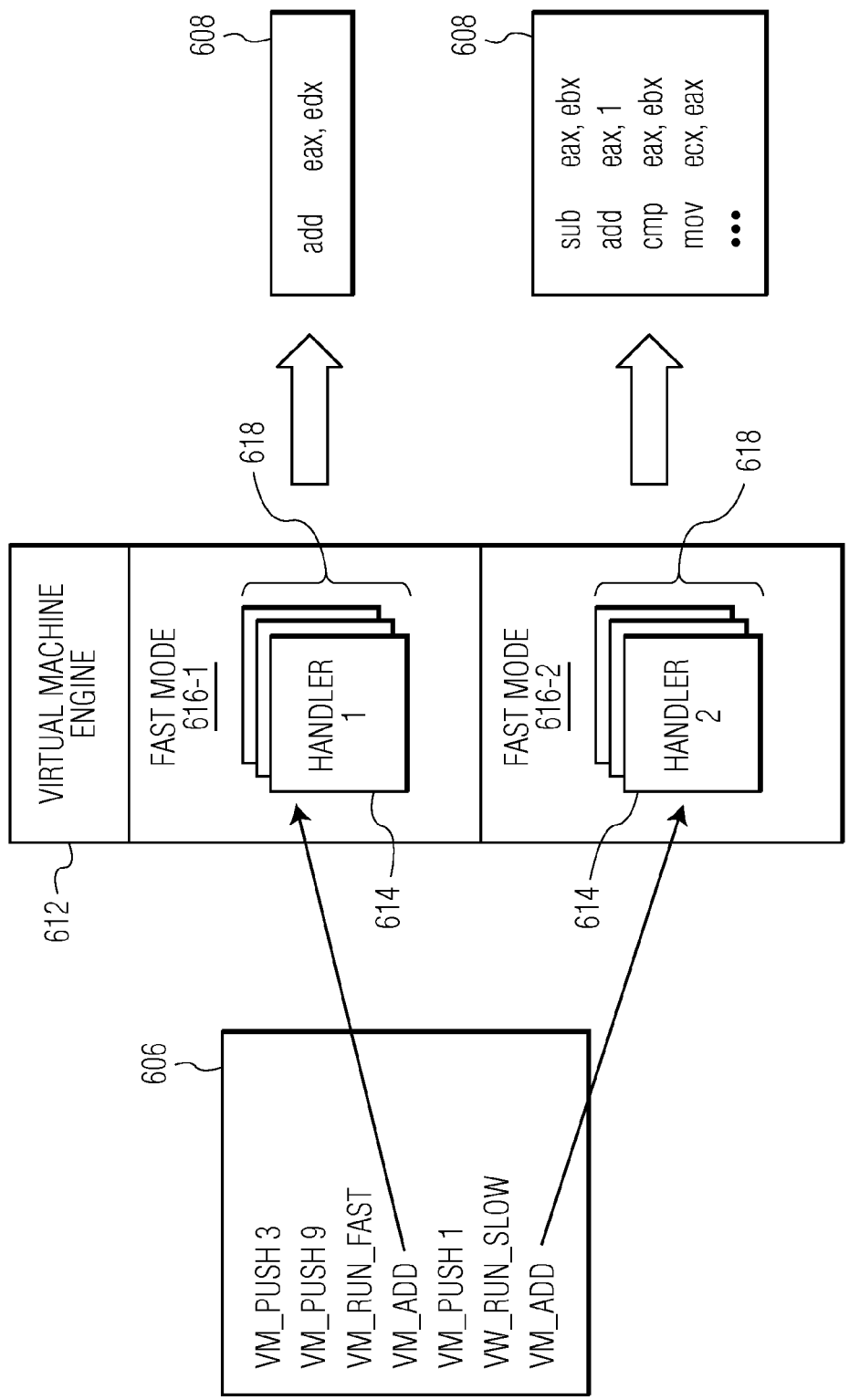
FIG. 6 illustrates a virtual machine engine receiving obfuscated bytecode and executing functions called by two different handlers from two different sets of handlers based on the run mode of the virtual machine engine.

In an embodiment, different handlers can be used depending on the run mode or run state of the virtual machine engine. FIG. 6 illustrates a virtual machine engine 612 receiving obfuscated bytecode 606 and executing functions 608 called by two different handlers 614 from two different sets of handlers 618 based on the run mode 616-1, 616-2 of the virtual machine engine. In an embodiment, a run mode of a virtual machine can be initially set on a global level (e.g., by a global variable in bytecode) or to a default run mode (e.g., by configuration settings of the virtual machine engine). The run mode can then be modified by subsequent instructions. As illustrated, the obfuscated bytecode contains instructions that modify the run mode of a virtual machine engine (e.g., VM_RUN_FAST and VM_RUN_SLOW). In an embodiment, when an instruction that modifies the run mode of a virtual machine engine is processed by a virtual machine engine, the virtual machine engine enters a mode, as indicated by the instruction, and matches subsequent instructions only with handlers of the mode until a subsequent instruction that modifies the run mode of a virtual machine engine is processed. In the illustration of FIG. 6, an instruction is processed that causes the virtual machine engine to enter into a "fast" run mode 616-1. Then, when the "VM_ADD" instruction is processed, the instruction will correspond to handler 1 and the corresponding assembly code will be generated. When a subsequent instruction is processed that causes the mode of the virtual machine engine to enter into a "slow" run mode 616-2, the virtual machine engine enters into a slow run mode. Then, when processing the "VM_ADD" instruction again, the instruction will correspond to handler 2 and the corresponding assembly code will be generated. Thus, rather than using several different bytecode instructions to control the level of obfuscation and execution speed, the run mode of a virtual machine engine can be changed to control the level of obfuscation and execution speed, but the same bytecode instructions can be used.

Figure 7:
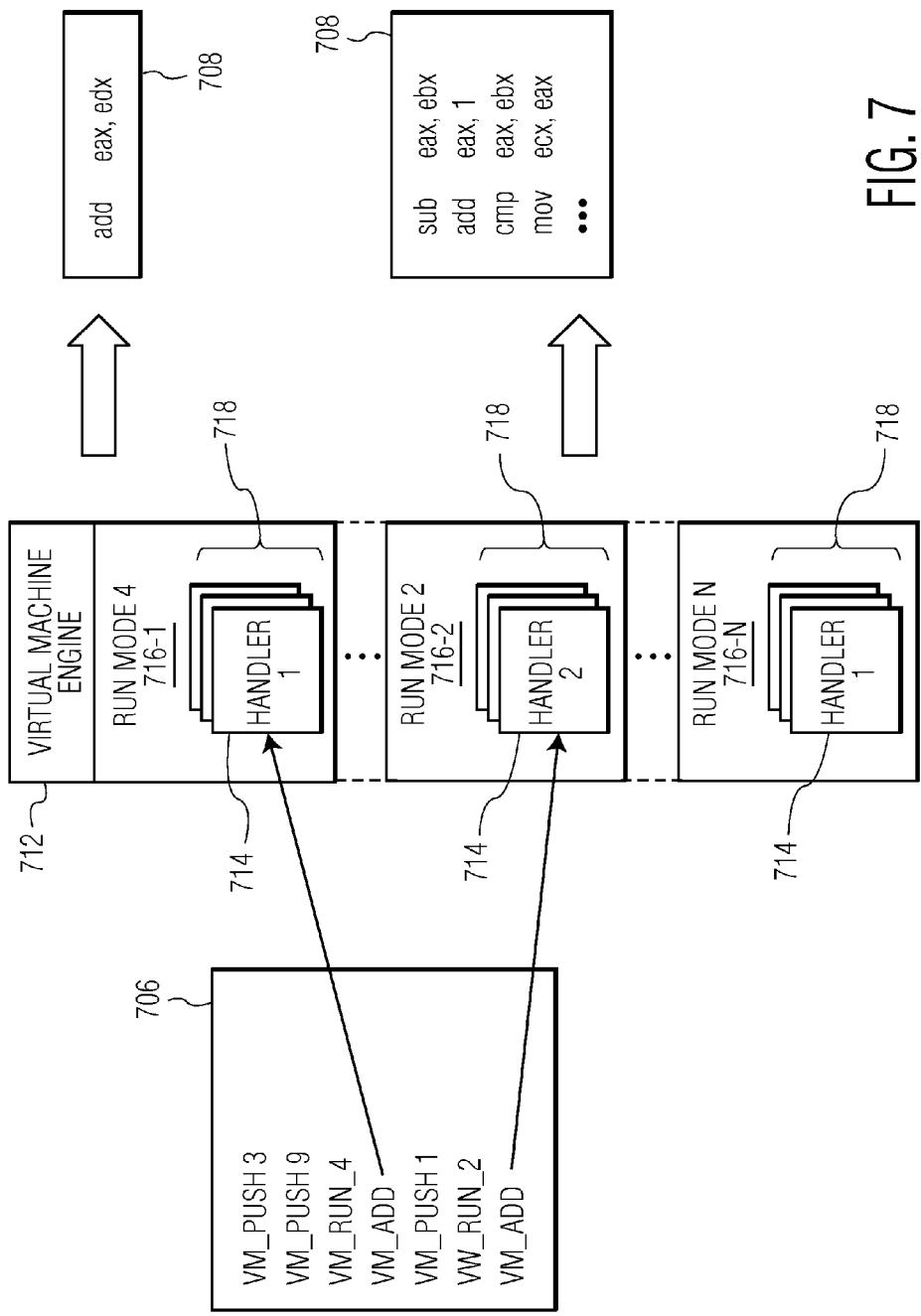
FIG. 7 illustrates a virtual machine engine receiving obfuscated bytecode and executing functions called by two different handlers from two different sets of handlers based on the run mode of the virtual machine engine.

Similar to the set of handlers corresponding to degrees of obfuscation and execution speeds described with reference to FIG. 5, multiple run states can be used as well. FIG. 7 illustrates a virtual machine engine 712 receiving obfuscated bytecode 706 and executing functions 708 called by two different handlers 714 from a set of handlers 718 based on the run mode 716-1-716-N of the virtual machine engine. In an embodiment, a virtual machine engine can have five run modes running from high obfuscation with slow execution speed to low obfuscation with fast execution speed. For example, run mode 2 716-2 corresponds to a run mode where handlers call functions to generate assembly code that favors obfuscation over execution speed, while run mode 4 716-1 corresponds to a run mode where handlers call functions to generate assembly code that favors execution speed over obfuscation. In the illustration of FIG. 7, an instruction is processed that causes the virtual machine engine to enter into "run mode 4." Accordingly, when "VM_ADD" is then processed, handler 1 is selected from the handlers of run mode 4 and corresponding assembly code is generated. Then, when a subsequent instruction changes the run mode to "run mode 2," the "VM_ADD" instruction is processed using handler 2 selected from the handlers of run mode 2 and corresponding assembly code is generated. Thus, the run mode of the virtual machine engine can be changed to control the level of obfuscation and execution speed in varying amounts while using the same bytecode instructions.

Figure 8B:
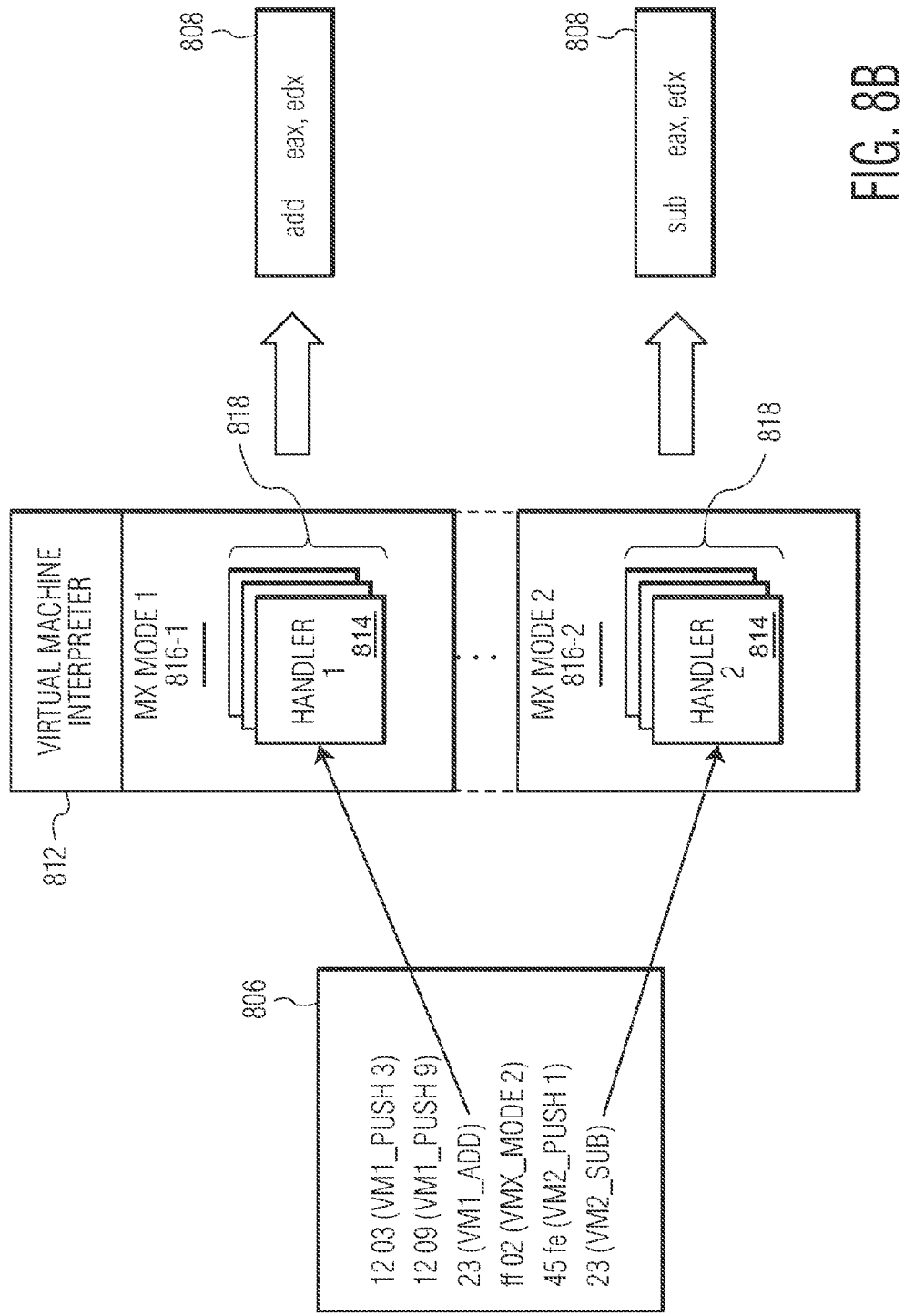
FIG. 8B illustrates a virtual machine engine receiving obfuscated bytecode with instructions from two different instructions sets associated with a single bytecode and executing functions called by handlers corresponding to the obfuscated bytecode.

In an embodiment, rather than adding unnecessary or convoluted steps to the generated assembly code in order to obfuscate the code, code can be obfuscated by configuring several handlers to correspond to a single bytecode. Thus, when the bytecode is executed, an attacker will be unsure how to interpret the bytecode because two different functions were performed as a result of the same bytecode FIG. 8A depicts a table 802 that indicates a mapping of bytecodes to virtual machine instructions depending on the mode of the virtual machine. In an embodiment, a virtual machine can be in one of two modes and can be transitioned from a first mode to a second mode by a special instruction. In the table depicted in FIG. 8A, the correct mapping for a bytecode for each mode is indicated for bytecodes "12 03", "12 09", "23", "ff 02", and "45 fe." In an embodiment, bytecode "ff 02" corresponds to a special instruction that transitions a virtual machine into VMX_MODE 2 and has the same mapping in either mode, while the other bytecodes have two different mappings. FIG. 8B illustrates a virtual machine engine 812 receiving obfuscated bytecode 806 with two different instructions associated with a single bytecode and executing functions 808 called by handlers 814 corresponding to the obfuscated bytecode. In an embodiment, the instruction set can be indicated similarly to the run mode or run state as described with references to FIGS. 6 and 7. As illustration in FIG. 8, the virtual machine engine begins in a default mode 816-1 and, when bytecode "23" is processed, handler 1 from a first set of handlers 818 is used to call a function to generate the appropriate assembly code for "VM1_ADD". When the virtual machine engine processes bytecode "ff 02", special instruction "VMX_MODE 2" is performed and the virtual machine engine enters into VMX Mode 2 816-2. As a result, subsequent bytecodes will be mapped to different instructions and be processed using a second set of handlers 818. For example, in mode 2, bytecode "23" is mapped to instruction "VM2_SUB" and when "VM2_SUB" is processed, handler 2 is used. Thus, an attacker may be confused when trying to correlate sections of the bytecode to sections of the generated assembly code because two seemingly identical sections of the bytecode produced different assembly code if the attacker is unaware of the mode transition between the two sections. Additionally, because superfluous code was not inserted into the assembly code, the execution speed of the assembly code is typically faster than techniques in which the assembly code includes superfluous code.

Figure 9:
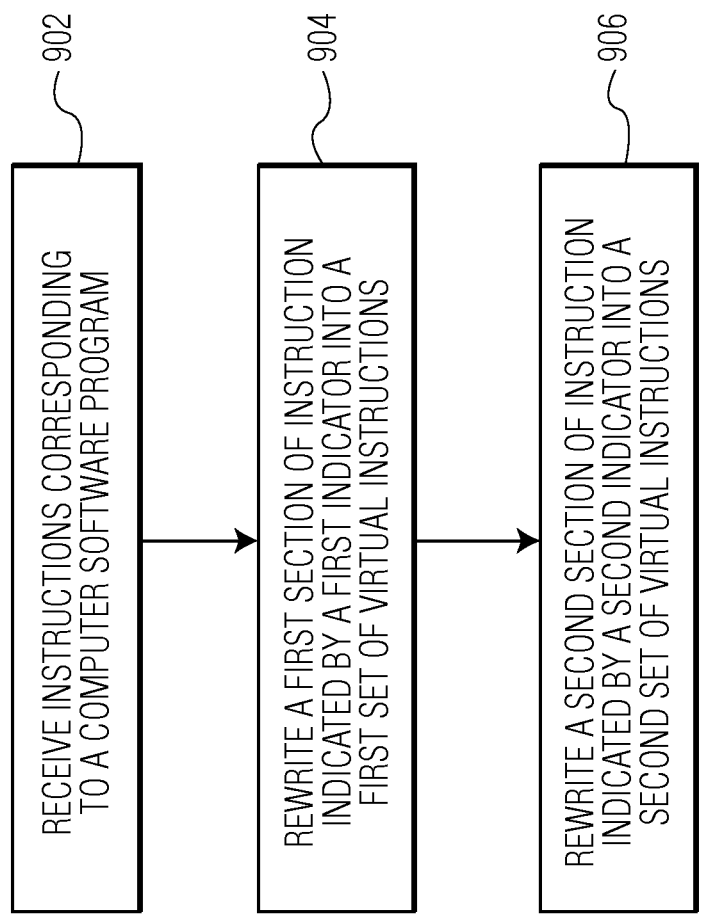
FIG. 9 is a flow chart diagram of a method for protecting computer software code in accordance with an embodiment of the invention.

FIG. 9 is a flow chart diagram of a method for protecting computer software code in accordance with an embodiment of the invention. At block 902, instructions corresponding to a computer software code are received. In an embodiment, the instructions are source code received by a compiler and include, at least, a first indicator and a second indicator used to indicate a level of obfuscation to be applied to a section of the source code. At block 904, a section of instructions indicated by a first indicator is rewritten into a first set of virtual instructions and, at block 906, a section of instructions indicated by a second indicator is rewritten into a second set of virtual instructions. In an embodiment, the first and second indicators are C pragmas, but other indicators can be used. In an embodiment, the first section of instructions is rewritten into virtual instructions including an indicator that, when interpreted, result in assembly code that favors execution speed over obfuscation, while the second section of instructions is rewritten into virtual instructions including an indicator that, when interpreted, result in assembly code that favors obfuscation over execution speed. As a result, the overall execution speed of the program can be faster than if both the first and second sections of instructions were rewritten, as a whole, into virtual instructions that result in assembly code that favors obfuscation over execution speed. Further, a higher level of obfuscation can be achieved for the second section of instructions than if the first and second sections of instructions were rewritten as a whole using virtual instructions that favor execution speed over obfuscation. Thus, greater obfuscation and protection can be achieved when needed without unnecessarily degrading performance.

Figure 10:
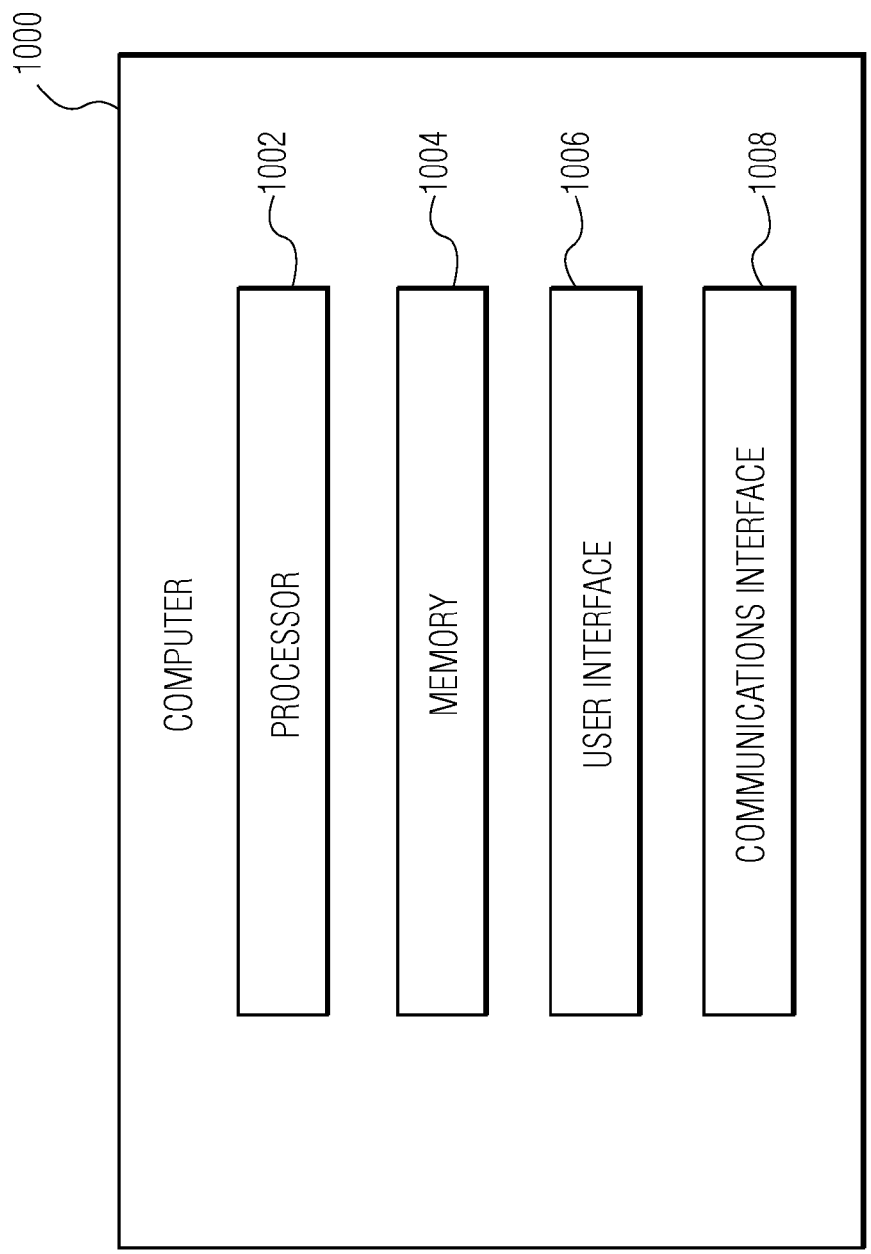
FIG. 10 is a block diagram of computer in which a virtual machine engine can run.

FIG. 10 is a block diagram of a computer 1000 in which a virtual machine engine can run. In an embodiment, the computer includes a processor 1002, memory 1004, a user interface 1006, and a communications interface 1008. In an embodiment the processor executes instructions stored in the memory and, when the instruction are executed, the above-described techniques are performed. In an embodiment, the user interface facilitates the interaction between a user and the computer. In an embodiment the user interface is a browser-based interface accessible to a user via interface devices with browser capability. In an embodiment, the communications interface can be a standard I/O bus for communication with a keyboard and mouse or the communications interface can be a network interface card (NIC) configured to receive input over standard TCP/IP.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a non-transitory computer useable storage medium to store a computer readable program that, when executed on a computer, causes the computer to perform operations, as described herein.

Furthermore, embodiments of at least portions of the invention can take the form of a computer program product accessible from a non-transitory computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for protecting computer software code, the method comprising:
   receiving instructions corresponding to the computer software code for an application, the instructions including a first section of instructions to protect that is indicated by a first indicator and a second section of instructions to protect that is indicated by a second indicator;
   rewriting the first section of instructions into a first section of virtual instructions; and
   rewriting the second section of instructions into a second section of virtual instructions;
   wherein the first section of virtual instructions includes a first virtual instruction that corresponds to a first handler and the second section of virtual instructions includes a second virtual instruction that corresponds to a second handler, the first handler having different properties than the second handler, and a property of the first handler corresponds to higher obfuscation and slower execution speed than the second handler.

2. The method of claim 1 further comprising rewriting a third section of instructions that is indicated by a third indicator into a third section of virtual instructions, wherein the third section of virtual instructions includes a virtual instruction that corresponds to a third handler, the third handler having a degree of obfuscation and execution speed within a range defined by the first and second handler.

3. The method of claim 1, wherein virtual instructions of the first section of virtual instructions are from a first set of virtual instructions and virtual instructions of the second section of virtual instructions are from a second set of virtual instructions.

4. The method of claim 1, wherein a set of virtual instructions used to form the first section of virtual instructions is a default set of virtual instructions and a set of virtual instructions used to form the second section of virtual instructions is a set of virtual instructions indicated by the second section of instructions.

5. The method of claim 1, wherein the first and second indicators are operators embedded in the computer software code.

6. The method of claim 1, wherein the first section of virtual instructions are configured such that the first section of virtual instructions will be interpreted using different handlers than the second section of virtual instructions and the second section of virtual instructions are configured such that the second section of virtual instructions will be interpreted using different handlers than the first section of virtual instructions.

7. The method of claim 1, wherein the first handler and the second handler generate the same assembly code.

8. The method of claim 1, further comprising executing the steps of receiving and rewriting with a computer system comprising a one or more processors and memory.

9. A non-transitory computer-readable storage medium storing instructions that, when executed by a computer, perform steps for protecting computer software code, the steps comprising:
   receiving instructions corresponding to the computer software code for an application, the instructions including a first section of instructions to protect that is indicated by a first indicator and a second section of instructions to protect that is indicated by a second indicator;
   rewriting the first section of instructions into a first section of virtual instructions; and
   rewriting the second section of instructions into a second section of virtual instructions;
   wherein the first section of virtual instructions includes a first virtual instruction that corresponds to a first handler and the second set of virtual instructions includes a second virtual instruction that corresponds to a second handler, the first handler having different properties than the second handler, and a property of the first handler corresponds to higher obfuscation and slower execution speed than the second handler.

10. The non-transitory computer-readable storage medium of claim 9 further comprising instructions that, when executed by a computer, perform steps comprising rewriting a third section of instructions that is indicated by a third indicator into a third section of virtual instructions, wherein the third section of virtual instructions includes a virtual instruction that corresponds to a third handler, the third handler having a degree of obfuscation and execution speed within a range defined by the first and second handler.

11. The non-transitory computer-readable storage medium of claim 9, wherein virtual instructions of the first section of virtual instructions are from a first set of virtual instructions and virtual instructions of the second section of virtual instructions are from a second set of virtual instructions.

12. The non-transitory computer-readable storage medium of claim 9, wherein a set of virtual instructions used to form the first section of virtual instructions is a default set of virtual instructions and a set of virtual instructions used to form the second section of virtual instructions is a set of virtual instructions indicated by the second section of instructions.

13. The non-transitory computer-readable storage medium of claim 9, wherein the first and second indicators are operators embedded in the computer software code.

14. The non-transitory computer-readable storage medium of claim 9, wherein the first section of virtual instructions are configured such that the first section of virtual instructions will be interpreted using different handlers than the second section of virtual instructions and the second section of virtual instructions are configured such that the second section of virtual instructions will be interpreted using different handlers than the first section of virtual instructions.

15. The non-transitory computer-readable storage medium of claim 9, wherein the first handler and the second handler generate the same assembly code.

16. The non-transitory computer-readable storage medium of claim 10, wherein the computer includes one or more processors and memory to perform the steps for protecting computer software code.

17. A computer-implemented system for protecting computer software code, the system comprising:
one or more processors; and
memory storing instructions that, when executed by the one or more processors, perform steps comprising:
receiving instructions corresponding to the computer software code for an application, the instructions including a first section of instructions to protect that is indicated by a first indicator and a second section of instructions to protect that is indicated by a second indicator;
rewriting the first section of instructions into a first section of virtual instructions; and
rewriting the second section of instructions into a second section of virtual instructions;
wherein the first section of virtual instructions includes a first virtual instruction that corresponds to a first handler and the second set of virtual instructions includes a second virtual instruction that corresponds to a second handler, the first handler having different properties than the second handler, and a property of the first handler corresponds to higher obfuscation and slower execution speed than the second handler.

18. The computer-implemented system of claim 17 further comprising instructions that, when executed, perform steps comprising rewriting a third section of instructions that is indicated by a third indicator into a third section of virtual instructions, wherein the third section of virtual instructions includes a virtual instruction that corresponds to a third handler, the third handler having a degree of obfuscation and execution speed within a range defined by the first and second handler.

19. The computer-implemented system of claim 17, wherein virtual instructions of the first section of virtual instructions are from a first set of virtual instructions and virtual instructions of the second section of virtual instructions are from a second set of virtual instructions.

20. The computer-implemented system of claim 17, wherein the first section of virtual instructions are configured such that the first section of virtual instructions will be interpreted using different handlers than the second section of virtual instructions and the second section of virtual instructions are configured such that the second section of virtual instructions will be interpreted using different handlers than the first section of virtual instructions.

* * * * *